US011430021B1

(12) United States Patent
Gary, Jr.

(10) Patent No.: US 11,430,021 B1
(45) Date of Patent: Aug. 30, 2022

(54) SOFTWARE DEVELOPMENT KIT (SDK) FOR NON-PROFIT LAYER DATA CAPTURE FOR ONLINE DONATION TRANSACTIONS

(71) Applicant: iDonate LLC, Plano, TX (US)

(72) Inventor: Raymond J. Gary, Jr., Dallas, TX (US)

(73) Assignee: iDonate LLC, Plano, TX (US)

( * ) Notice: Subject to any disclaimer, the term of this patent is extended or adjusted under 35 U.S.C. 154(b) by 0 days.

(21) Appl. No.: 17/460,136

(22) Filed: Aug. 27, 2021

Related U.S. Application Data

(60) Provisional application No. 63/071,914, filed on Aug. 28, 2020.

(51) Int. Cl.
| | | |
|---|---|---|
| *G06Q 30/02* | (2012.01) | |
| *G06F 16/958* | (2019.01) | |
| *G06Q 20/38* | (2012.01) | |
| *G06Q 30/00* | (2012.01) | |

(52) U.S. Cl.
CPC ....... *G06Q 30/0279* (2013.01); *G06F 16/958* (2019.01); *G06Q 20/389* (2013.01); *G06Q 30/01* (2013.01)

(58) Field of Classification Search
CPC .. G06Q 30/0279; G06Q 30/01; G06Q 20/389; G06F 16/958
See application file for complete search history.

(56) References Cited

U.S. PATENT DOCUMENTS

| | | | | |
|---|---|---|---|---|
| 11,055,701 | B1* | 7/2021 | Henderson | G06Q 20/367 |
| 2012/0054100 | A1* | 3/2012 | Pfohl | G06Q 30/0279 |
| | | | | 705/44 |
| 2012/0143772 | A1* | 6/2012 | Abadir | G06Q 20/401 |
| | | | | 705/75 |
| 2015/0081463 | A1* | 3/2015 | Horton | G06Q 20/40 |
| | | | | 705/21 |
| 2019/0034929 | A1* | 1/2019 | Tang | H04L 9/0825 |
| 2020/0089898 | A1* | 3/2020 | Borkar | G06F 9/543 |
| 2020/0110792 | A1* | 4/2020 | Tsabba | G10L 17/00 |
| 2021/0042796 | A1* | 2/2021 | Khoury | G06Q 30/0267 |

* cited by examiner

*Primary Examiner* — Scott C Anderson
(74) *Attorney, Agent, or Firm* — Haynes and Boone, LLP

(57) ABSTRACT

A system and method according to which a donation transaction is conducted. The method includes providing, via a network, an embeddable form, wherein the embeddable form is associated with a non-profit, and wherein the embeddable form is adapted to be displayed on a graphical user interface to receive payment data and payment metadata associated with the payment data. The method also includes: transmitting, via the embeddable form and the network, the payment data to a third-party server for tokenization of the payment data; receiving, by a software development kit ("SDK") and via the network, a unique token associated with the payment data, and the payment metadata associated with the payment data; executing, by the SDK, the donation transaction in accordance with the unique token and the payment metadata; and storing, by the SDK, the unique token associated with the payment data and the payment metadata.

20 Claims, 11 Drawing Sheets

FIG. 2 – PRIOR ART

AMOUNT MODULE
60

DONOR INFORMATION MODULE
65

DESIGNATED FUND(S) MODULE
75

TRIBUTE GIFT MODULE
80

DONOR GIFT MODULE
400

CAMPAIGN IDENTIFIER MODULE
405

ANONYMITY PREFERENCE MODULE
410

CORPORATE MATCH DESIGNATION MODULE
415

RECURRING DONATION MODULE
420

SOFTWARE DEVELOPMENT KIT (SDK) FOR NON-PROFIT LAYER DATA CAPTURE FOR ONLINE DONATION TRANSACTIONS

CROSS-REFERENCE TO RELATED APPLICATION

This application claims the benefit of the filing date of, and priority to, U.S. Application No. 63/071,914, filed Aug. 28, 2020, the entire disclosure of which is hereby incorporated herein by reference.

COPYRIGHT NOTICE AND AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF DISCLOSURE

Embodiments of this application relate to systems configured to process or facilitate online donation transactions.

BACKGROUND

Online transaction systems generally enable the transfer of purchaser payment information in exchange for some good or service. In some situations, online transaction systems have been modified to for use by a non-profit, such as a charity, to receive donations, namely transferring payment information as a donation, instead of in exchange for a good or service. These online systems have provided non-profit organizations with the ability to solicit and receive donations over the internet, but these systems lack the ability to collect, transmit, and utilize other important non-profit specific data associated with an online donation to a non-profit organization. Non-profits are all very different, both in organizational structure and in the communities and/or causes that they serve. Currently, there is no one-size-fits-all solution that is available to meet the needs of all the non-profit organizations seeking to collect donations online.

One problem with conventional systems is that there is currently no way to easily customize the types of non-profit layer data collected when receiving a donation. Many current online transaction systems lack the flexibility and customization to meet the specific non-profit layer data collection needs of different non-profit organizations.

Another problem with the conventional systems is that they require the non-profit to provide or host its own server. Non-profit organizations vary in size and/or organizational capacity. Smaller or newer non-profit organizations often lack the capital or physical infrastructure to host servers to store donation data and to sufficiently facilitate donation transactions. Many current online transaction systems, however, require communication with, and/or storage of some amount of data, on the client side, i.e., the non-profit organization's side. In many cases, these requirement(s) are barriers to entry for some non-profit organizations and/or, at the very least, reduce the amount of donation funds available to support the non-profit organization's target communities and/or causes.

BRIEF DESCRIPTION OF THE DRAWINGS

FIG. 9 is a diagrammatic illustration of a plurality of modules, according to one or more embodiments.

DETAILED DESCRIPTION

Figure 1:
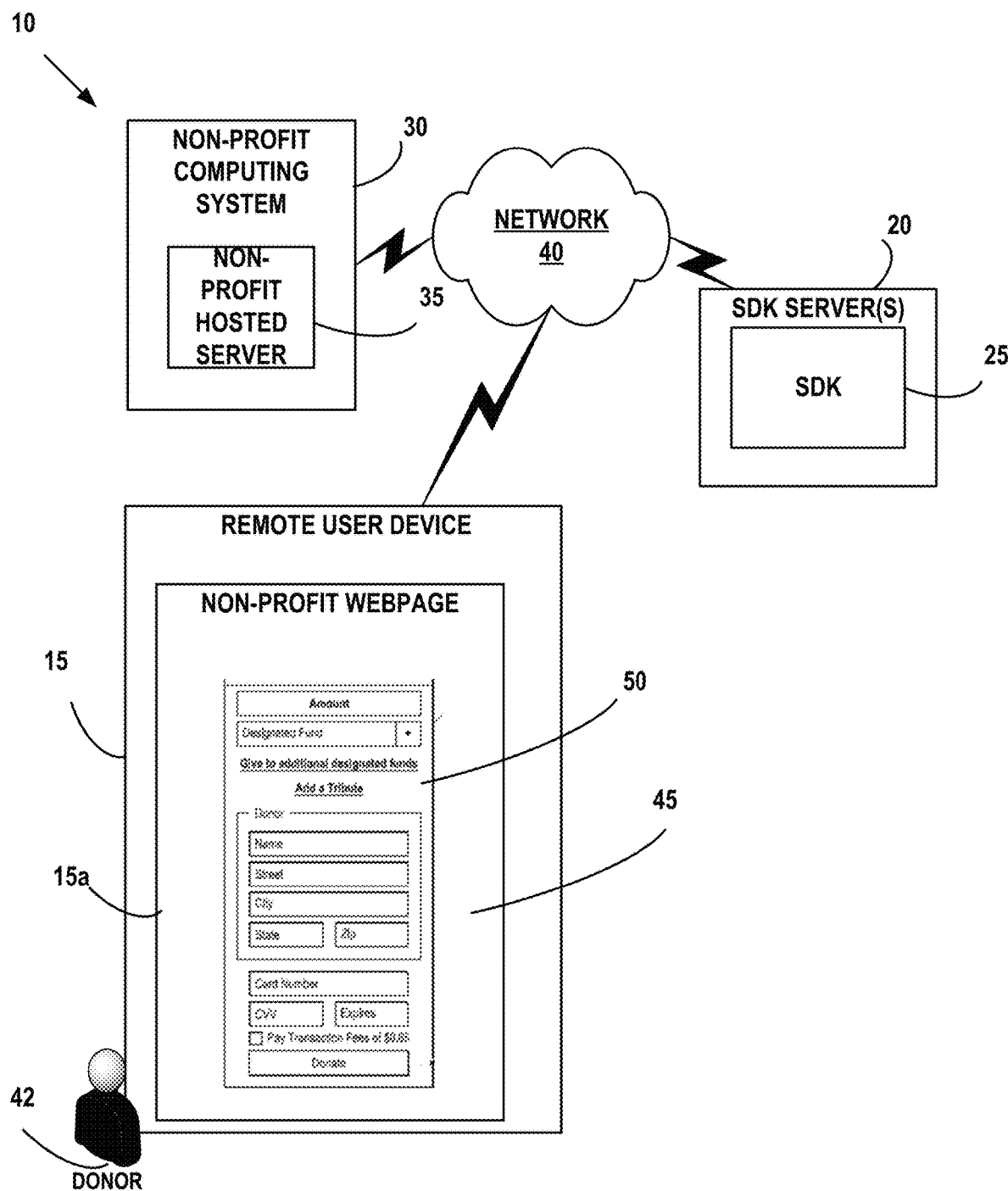
FIG. 1 is a diagrammatic illustration a system that includes an SDK server and a remote user device having a display that is configured to display a plurality of webpages, according to one or more embodiments.

The present disclosure provides different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity and does not in itself dictate a relationship between the various embodiments and/or configurations discussed.

In an example embodiment and referring to FIG. 1, a system is illustrated and designated by the numeral 10. In an example embodiment, the system 10 includes a remote user device 15 and an SDK server 20 within which an SDK 25 is stored and executed, and a non-profit computing system 30 that includes a non-profit hosted server 35, all of which are in communication via a network 40. Generally, a user 42 such as a donor provides inputs via a user interface 15a that is configured to display a window or webpage 45 that includes an embeddable form 50 that receives payment information and non-profit layer data that is stored as metadata to the payment information.

In some embodiments, the system 10 solves problems that are unique to the internet, specifically to the technical field of data capture and processing for online donation transactions. A first problem is that conventional online donation systems do not allow for easy customization of the data that is to be tracked and recorded. As noted above, non-profit organizations desire to collect different non-profit layer data when receiving a donation. Therefore, the ability to customize the online donation interface, and thus the data collected, is of paramount importance. However, conventional online transaction systems lack the flexibility and customization to meet the specific non-profit layer data collection needs of different non-profit organizations.

Figure 2:
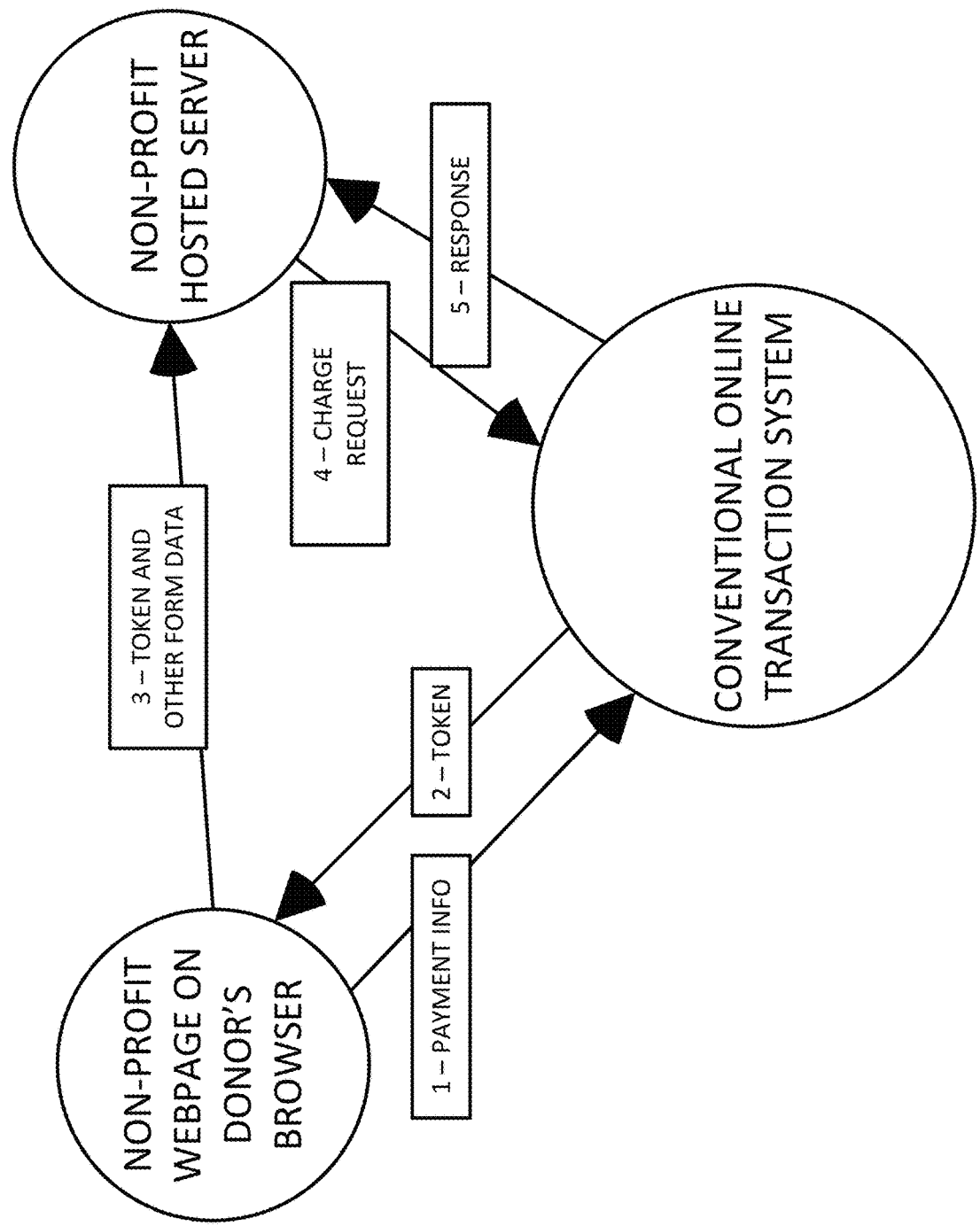
FIG. 2 is a data flow diagram associated with the prior art.
Figure 3:
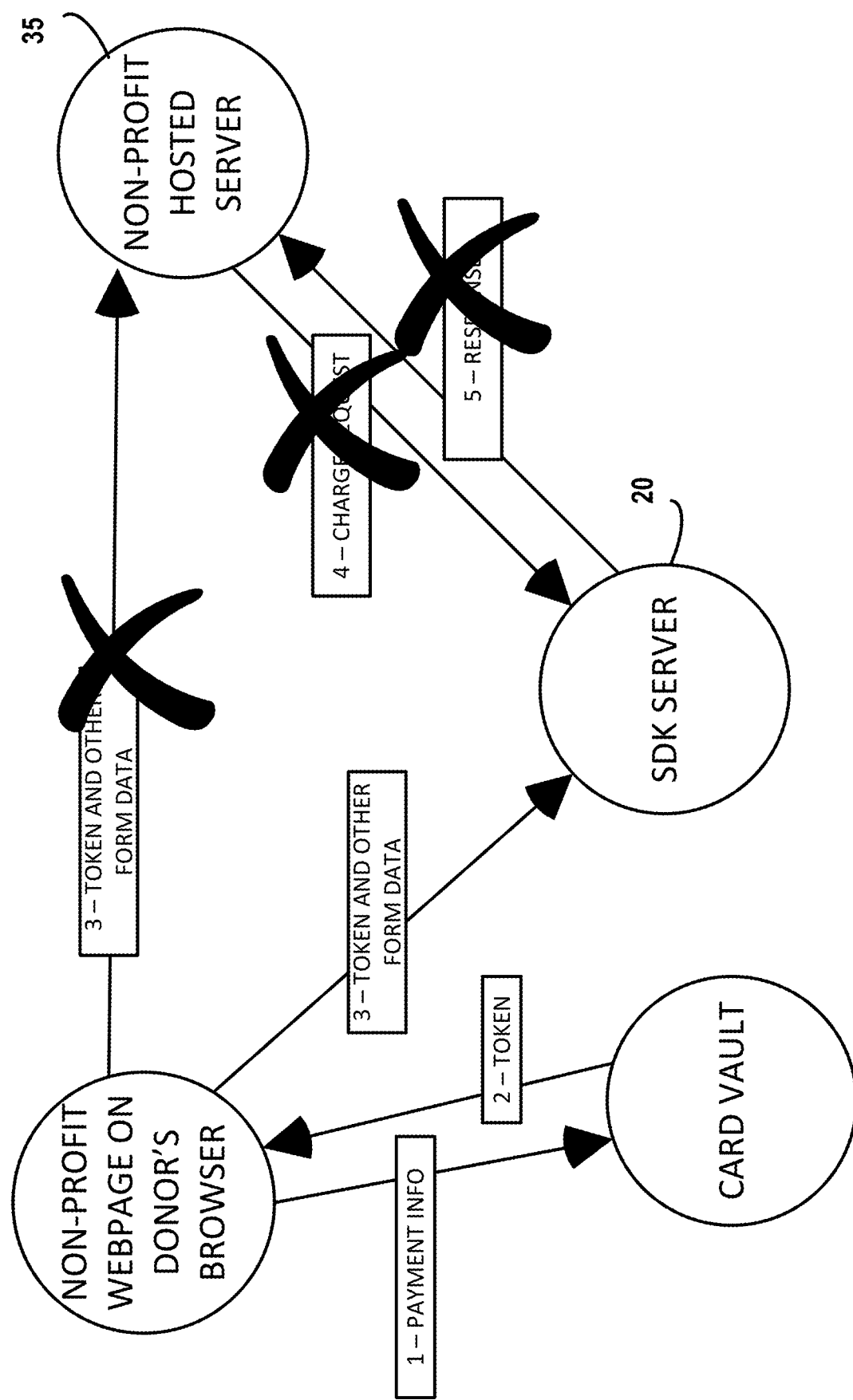
FIG. 3 is a data flow diagram associated with the system of FIG. 1, according to an example embodiment.

A second problem is that conventional donation transaction systems require a non-profit to host servers in order to store donation data and sufficiently facilitate donation transactions. These non-profit hosted servers are needed because conventional online donation transaction systems require communication with, and/or storage of some amount of data, on the non-profit organization's side. In many cases, these requirement(s) are barriers to entry for some non-profit organizations and/or, at the very least, reduce the amount of donation funds available to support the non-profit organization's target communities and/or causes. FIG. 2 illustrates a data flow associated with a conventional online donation transaction system. As illustrated, from a non-profit webpage displayed using a donor's browser, payment information is sent to a conventional online transaction system. In response to the payment information sent from the webpage displayed using the donor's browser, the conventional online transaction system tokenizes the payment data and sends a token to the non-profit webpage displayed using the donor's browser. From the non-profit webpage and associated web browser, the token and other form data is sent to a non-profit hosted server. The non-profit server then sends a charge request to the conventional online transaction system and in response, the conventional online transaction system returns a response to the non-profit hosted server. Thus, the non-profit hosted server is key to the data flow and is required for the non-profit to process donations. FIG. 3 illustrates one example data flow associated with the SDK 25. As illustrated, from the non-profit webpage displayed using a donor's browser, the payment information is sent to a card vault so that the payment information is tokenized. The card vault then sends the token back to the browser and the browser then sends the token and other form data to the SDK server 20. From the non-profit webpage and associated web browser, the token and other form data is sent to the SKD server 20—not the non-profit hosted server 35. Thus, the non-profit hosted server 35 is omitted from the example data flow.

Figure 4:
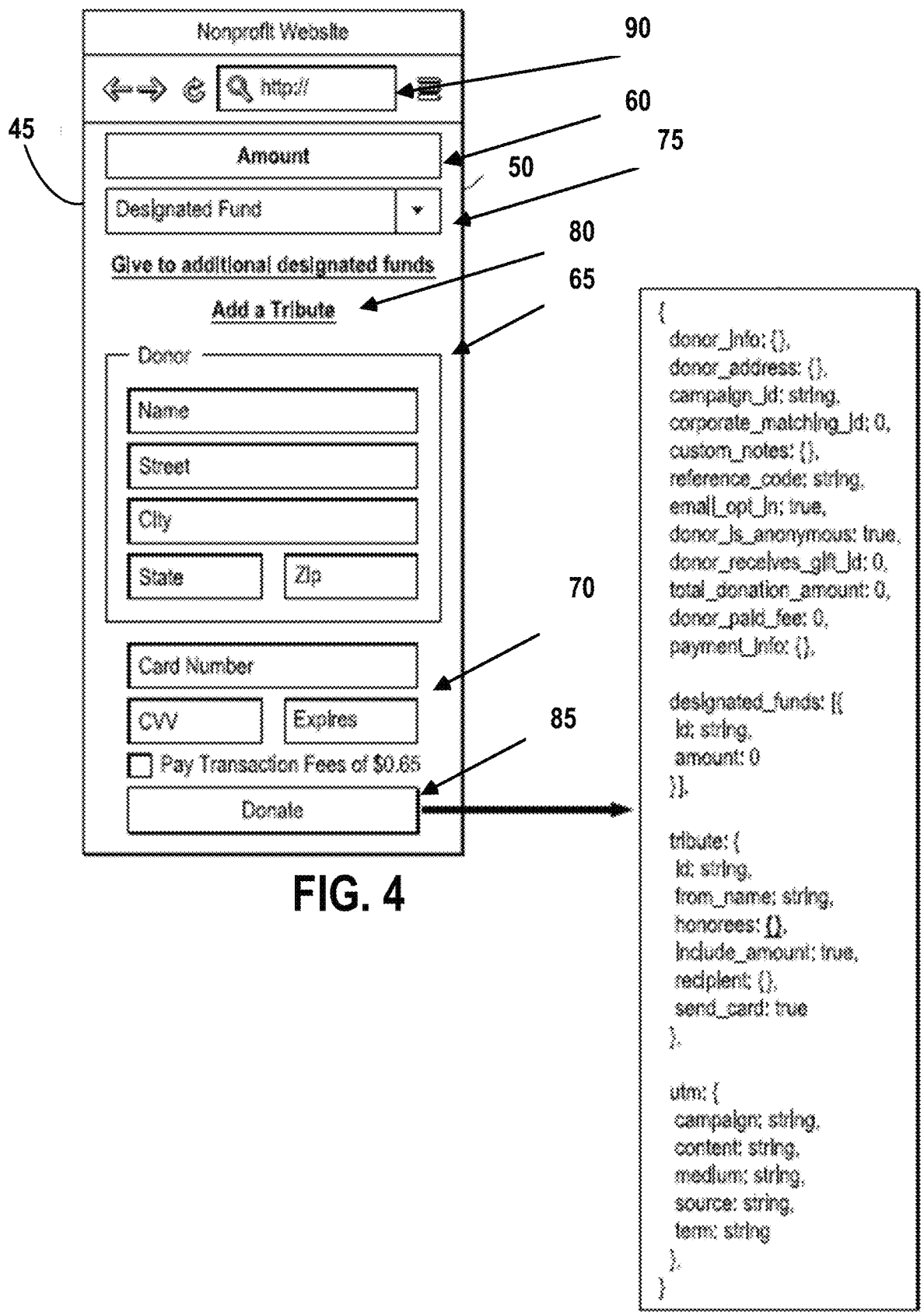
FIG. 4 is a diagrammatic illustration of a portion of a webpage displayed on the display of the remote user device of FIG. 1 and portions of an example HTML associated with the webpage.

FIG. 4 illustrates one example of the webpage 45 that includes the embeddable form 50 and portions of an example HTML file associated with the webpage 45. As illustrated, the webpage 45 includes or displays the embeddable form 50. As illustrated, the embeddable form 50 includes or displays an amount module 60 to receive an amount, donor information module 65 to receive information relating to the donor such as an address of the donor, payment module 70 to receive payment data or payment information from the donor, a designated fund(s) module 75 to receive designation of funds, a tribute module 80 to receive tribute information from the donor, and a selectable button 85 or other input element that when selected, initiates the execution of the donation. Moreover, the webpage 45 is associated and may display a URL 90. After the donor provides the requested information via the modules 60, 65, 70, 75, and/or 80, the donor selects the selectable button 85 to initiate the execution of the donation. After the selectable button 85 is selected, at least a portion of the data entered via the modules 60, 65, 75, and 80 becomes payment metadata or enriched data to the payment data entered via the module 70 and/or a token that is created based on the payment data entered via the module 70. The payment metadata may include donor information from the module 65, donor address from the module 65, campaign id from the URL 90, corporate matching id, custom notes, reference code string, email opt in, an anonymity preference of the donor, an indication of whether the donor receives a gift, a total donation amount, indication of whether the donor paid a transaction fee, the payment info from the module 70, designated funds data from the module 75, tribute data from the module 80 and/or UTM data from the URL 90 or from another source. The payment metadata can be customized based on the combination of modules display and/or included in the form 45. In some embodiments, one or more of the modules 60, 65, 70, 75, and 80 receive information or data that becomes a read-only reference to a value.

Figure 5:
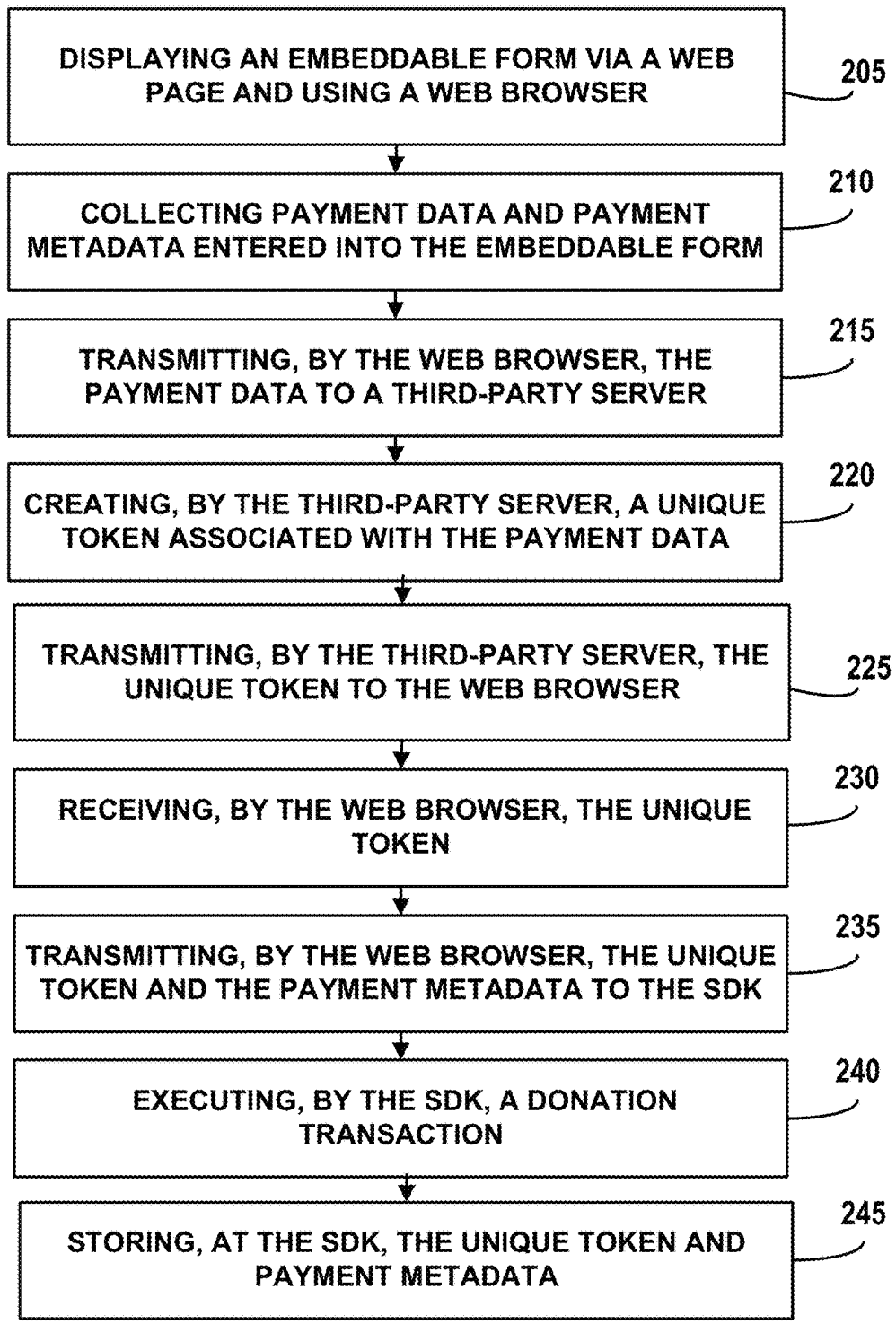
FIG. 5 is a flow chart illustration of a method of operating the system of FIG. 1, according to one or more embodiments.

In an example embodiment, as illustrated in FIG. 5 with continuing reference to FIGS. 1 and 3-4, a method 200 of using the system 10 to capture payment metadata during execution of an online donation transaction includes displaying an embeddable form via a webpage and using a web browser at step 205, collecting payment data and payment metadata entered into the embeddable form at step 210, the web browser transmitting the payment data to a third-party server at step 215, the third-party server creating a unique token associated with the payment data at step 220, the third-party server transmitting the unique token associated with the payment data to the web browser at step 225, the web browser receiving the unique token associated with the payment data at step 230, the web browser transmitting the unique token and payment metadata to the SDK 25 at step 235, the SDK 25 executing a donation transaction at step 240, and the SDK 25 storing the unique token and the payment metadata at step 245.

In some embodiments and at the step 205, the embeddable form 50 is displayed or provided via the webpage 45 and using a web browser. Generally, the embeddable form 50 is displayed to the donor 42 via the webpage 45, which is accessed via the donor's web browser on his or her remote user device 15. The web browser may be any application that allows the remote user device 15 to access the network 40. Generally, the webpage 45 is generated using the web browser and based on an HTML document or the like.

The displayed webpage 45 is based on an HTML file or HTML document. In some embodiments, the HTML file on which the webpage 45 is based has a head section that is configured to link an SDK API and a ReCaptcha API. Moreover, and in some embodiments, the HTML file on which the webpage 45 is based includes a body section that includes a button element which its onclick is set to "grecaptcha.execute( )". In some embodiments, the button element is associated with or is the selectable button 85. In some embodiments, the HTML file on which the webpage 45 is based associates the button element with a "g-recaptcha" class, a "data-sitekey" for the non-profit, and a data callback function "recaptchaCallback." In some embodiments, the function name, recaptchaCallback, is defined as the callback value for the Recaptcha element. In some embodiments, the "data-size" is "invisible." Moreover, and in some embodiments, the HTML file on which the webpage 45 is based has an initial configuration set that provides an organization id, which is associated with a non-profit, and a payment gateway associated with the non-profit. Example portions of an HTML file that include the initial configuration are shown below. The initial configurations are supplied statically, at the page level and are considered initial data.

Figure 6:
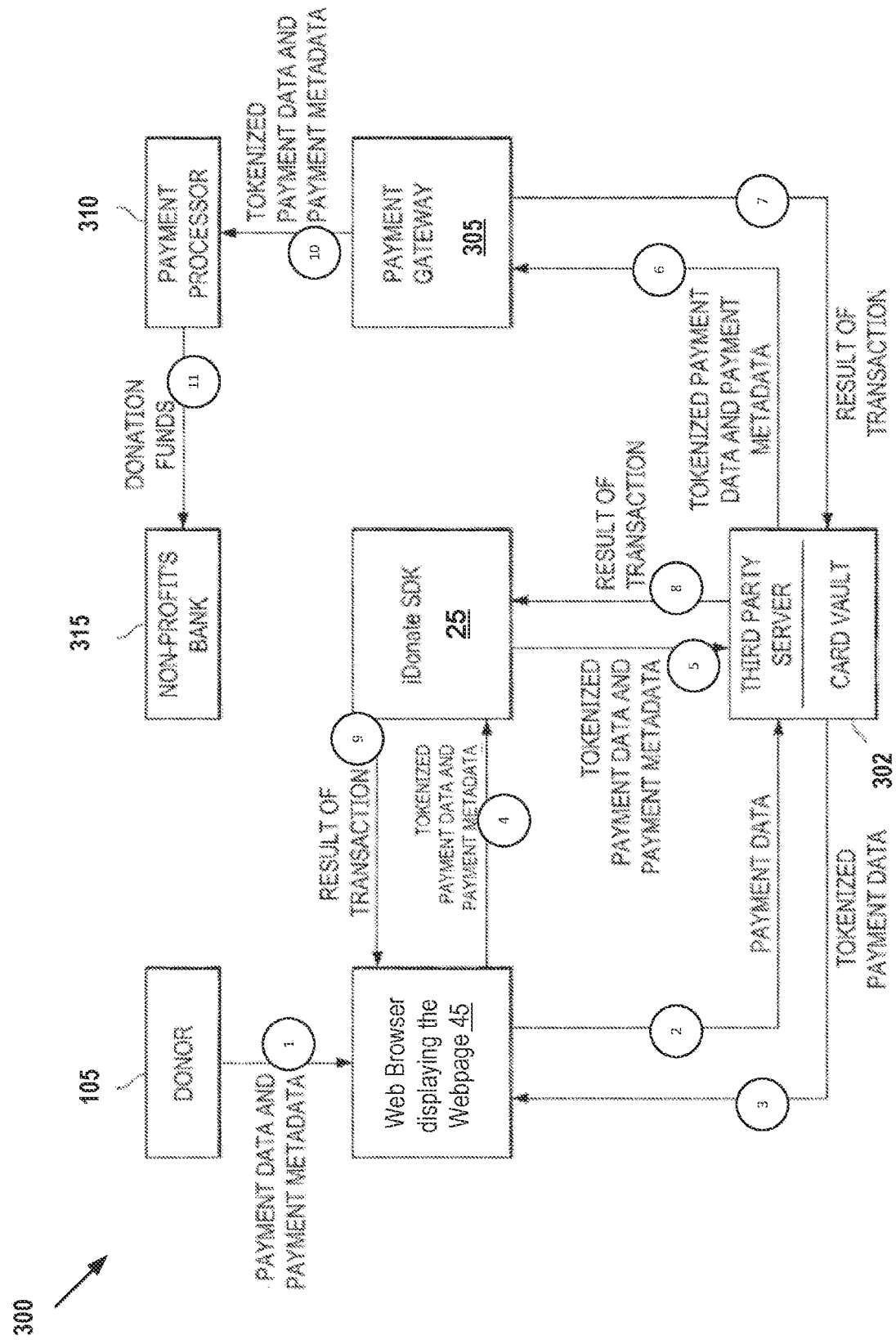
FIG. 6 is a data flow diagram associated with the system of FIG. 1 and the method of FIG. 5, according to an example embodiment.

```
const config={
    organizationId: '2aa2e362-51aa-483d-bedd-645ae18cc1f3',
    paymentGatewayId: '12344321-e605-429e-b9a9-4516738635db',
    enableSandboxMode: true, // the SDK client will use
        Staging resources if true
``` recaptchaType: 'v2', //'v2' and 'invisible' recaptcha types are supported.
};

In some embodiments and at the step 210, the payment data and metadata entered into the embeddable form are collected. In some embodiments, the data received via the modules 60, 65, 70, 75, and 80 is referred to as metadata because at least portions of the data entered or collected via the modules 60, 65, 70, 75, and 80 will become metadata. In some embodiments, collected data includes data received via any one or more of the modules 60, 65, 70, 75, and 80. In some embodiments, non-profit layer data includes data entered via one or more of the modules 60, 65, 70, 75, and 80. FIG. 6 illustrates a data flow 300 associated with the method 200. As illustrated in the data flow 300, the donor 42 provides payment data and payment metadata to the non-profit webpage 45. Example portions of an HTML file associated with data received via the webpage 45 are shown below.

```
const billingContact={
   firstName:'old',
   lastName:'bill',
   email:'ya@hoo.com'
};
const billingAddress={
   address1:'1 Fakery Way',
   city:'Palo Alto',
   state:'CA',
   zip:'90210',
   country:'US';
},
const bankAccountInput={
   routingNumber:'#', //user-populated
   accountNumber:'#'//user-populated
};
```

In some embodiments and at the step 215, the web browser transmits the payment data to a third-party server. As illustrated in the data flow 300 of FIG. 6, a web browser transmits the payment data to a third-party server 302. In some embodiments, the third-party server 302 is a card vault. The third-party server 302 is separate from and different from the non-profit computing system 30. Generally, the transmission is via the network 40. In certain embodiments, the transmission of the payment data is performed automatically and upon the selection of the selectable button 85. For example, the selection of the selectable button 85 causes the payment data provided by the user to be passed to idonateclient.tokenizecardconnectbankaccount( ) as a parameter object. Example portions of an HTML file associated with the transmission of payment data are shown below.

```
function recaptchaCallback(recaptchaToken) {
   idonateClient
      .tokenizeCardConnectBankAccount({
      routingNumber: bankPaymentInput.routingNumber,
      accountNumber: bankPaymentInput.accountNumber
   })
```

In some embodiments and at the step 220, the third-party server creates a unique token associated with the payment data. As such, the bank account, credit card information, or other payment data is tokenized using a third-party server 302 or third-party application to provide tokenized payment data, or the unique token. In some embodiments, the third-party server 302 is associated with a card vault like, for example, Spreedly Card Vault. The card vault will securely store the credit card or bank information of the donor 42. As a further data protection measure, the payment data only passes through PCI Level 1 Compliant organizations, including, for example, Spreedly Card Vault and an associated payment gateway and payment processor. In some embodiments, the unique token is a unique identifier associated with the payment data that cannot be mathematically reversed.

In some embodiments and at the step 225, the third-party server 302 transmits the unique token associated with the payment data to the web browser. As illustrated in the data flow 300 of FIG. 6, the third-party server 302 transmits the tokenized payment data to the web browser. In some embodiments, this transmission is a result of the callback function.

In some embodiments and at the step 230, the web browser receives the unique token associated with the payment data. The return of the function idonateclient.tokenizecardconnectbankaccount( ) using the parameter object sent is passed as tokenResult. Example portions of an HTML file associated with the return of the token Result shown below.

```
.then((token Result)=>{
   console.log('received token Result', token Result);
   return idonateClient.createPaymentMethod({
      paymentGatewayId: config.paymentGatewayId,
      paymentMethodType: 'bank_account',
      paymentMethodToken: token Result.token,
      recaptchaToken: recaptchaToken,
      contact: billingContact,
      address: billingAddress
   });
})
```

In response to receiving the token or TokenResult, a payment method is created that is passed to the next step. The payment method is created using idonateClient.createPaymentMethod( ) using an object as the parameter. The object is defined as follows (with tokenResult, recaptchaToken, and billingContact being data previously set up):

paymentGatewayId;
    config.paymentGateWayId
    paymentMethodsType: 'bank_account'
    paymentMethodToken; token Result.token
    recaptchaToken: recaptchaToken
    contact: billingcontact
    address: billingAddress The return value of idonateClient.createPaymentMethod( ) using the object defined above as a parameter is used to pass to the next step as paymetMethodResult.

In some embodiments and at the step 235, the web browser transmits the unique token and payment metadata to the SDK 25. As illustrated in the data flow 300 of FIG. 6, the web browser sends the tokenized payment data and the metadata to the SDK 25. In some embodiments, a return value of a function is used during the step 235. During the step 235, an object is passed to idonateClient.createTransaction( ), with the object including the following:

paymentGatewayId;
    config.paymentGatewayId
    paymentMethodId:
    paymentMethodResult.paymentMethodId
    recurring Frequency: [user provided user frequency]
    paymentAmount: [user provided donation amount]
    currency: [currency of donation]
    billingContact: billingContact
    billingAddress: billingAddress
    recaptchaToken: recaptchaToken
    corporateMatchingId: [an organization id]

Example portions of an HTML file associated with transmittal of the unique token and payment metadata to the SKD 25 are shown below.

```
    return idonateClient.createPaymentMethod({
        paymentGatewayId: config.paymentGatewayId,
        paymentMethodType: 'bank_account',
        paymentMethodToken: token Result.token,
        recaptchaToken: recaptchaToken,
        contact: billingContact,
        address: billingAddress
    });
}).then((paymentMethodResult)=>; {
    console.log('received paymentMethodResult:', paymentMethodResult);
    return idonateClient.createTransaction({
        paymentGatewayId: config.paymentGatewayId,
        paymentMethodId:   paymentMethodResult.paymentMethodId,
        recurringFrequency: 'once',
        paymentAmount: 5.0,
        currency: 'USD',
        billingContact: billingContact,
        billingAddress: billingAddress,
        recaptchaToken: recaptchaToken,
        corporate Matching Id: −1
    });
}).then((createTransactionResult)=>; {
    console.log("received createTransactionResult:", createTransactionResult);});
```

In some embodiments and at the step 240, the SDK 25 executes a donation transaction. The SDK 25 executes the donation transaction in accordance with the tokenized payment data (i.e., unique token) and the payment metadata collected by the embeddable form 50. To execute the donation transaction, the SDK 25 transmits, via the network 40, the tokenized payment data and, in some embodiments, the payment metadata to a third-party server 302 (illustrated in FIG. 6). As illustrated in the data flow 300 of the FIG. 6, the third-party server 302 then transmits, via the network 40, the tokenized payment data and, in some embodiments, the payment metadata to a payment gateway 305. The payment gateway 305 then transmits, via the network 40, the tokenized payment data and, in some embodiments, the payment metadata to a payment processor 310 associated with a non-profit's bank 315. Once the payment gateway 305 transmits the tokenized payment data, the payment gateway 305 will also transmit a string of data containing the result of the transaction to the third-party server 302. The result of the transaction is then transmitted through the third-party server 302 to the SDK 25 and again through the SDK 25 to the web browser displaying the webpage 45. Once it is determined that the transaction is valid by the payment gateway 305 and payment processor 310, the payment gateway 305 will transmit the donation funds to a bank 315 associated with the non-profit. The transmission of the donation funds may happen immediately, however, in some embodiments, the transmission can happen up to 24 or 48 hours after approval of the transaction by the payment gateway 305 and payment processor 310.

In some embodiments and at the step 245, the SDK 25 stores the unique token and the payment metadata. As such, the SDK 25 captures the non-profit data layer, as it forms the payment metadata. In several embodiments, the SDK 25 records the result of the transaction on a server associated with the SDK 25, such as the SDK server 20. The server associated with the SDK 25 may, in some embodiments, be hosted by an entity associated with the SDK 25 or may be hosted by a PaaS or IaaS provider. Once the result of the transaction is received by the non-profit webpage 45, the webpage 45 will display the result to the donor 42 via the webpage 45 or an updated webpage.

In certain embodiments, the collected non-profit layer data is data that relates to the indication that the donation is to be recurring and a time interval between recurring donations, a campaign identifier, a tribute gift, an anonymity preference, a fund designation, or any combination thereof. Further, in some cases, the provided embeddable form can be customized by the non-profit to collect different payment metadata. Specifically, in certain embodiments, the embeddable form is customized to collect different combinations of non-profit layer data according to the needs of a specific non-profit.

In some embodiments, payment information may be, or include, credit card or bank information, tokenized card data and a payment amount, and a gateway token such as a username and password information.

Figure 7:
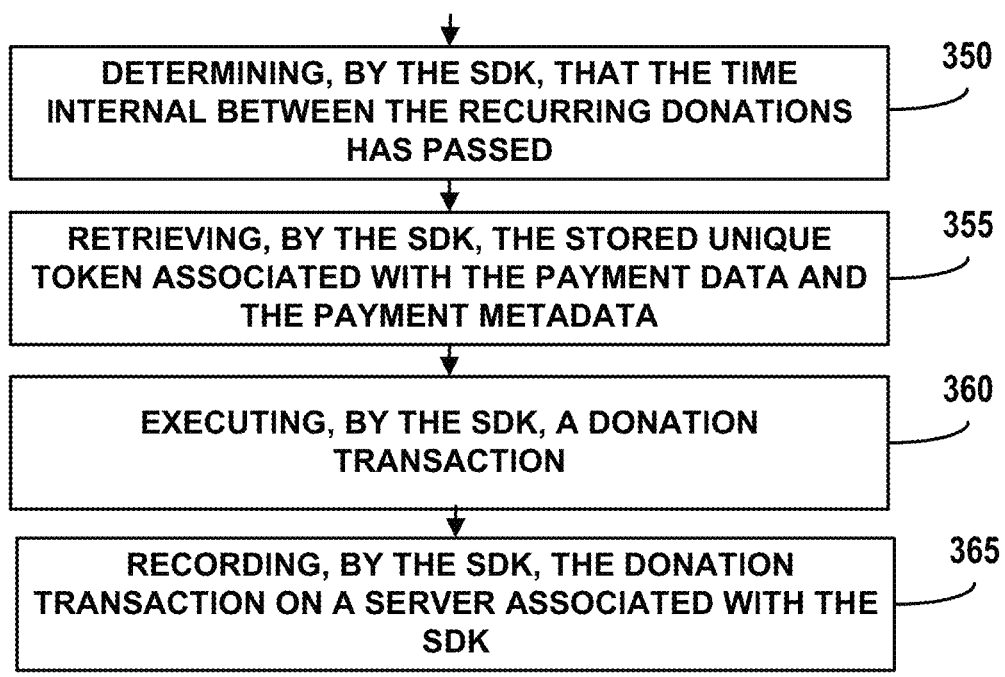
FIG. 7 is a flow chart illustration of a method of operating the system of FIG. 1, according to one or more embodiments.
Figure 8:
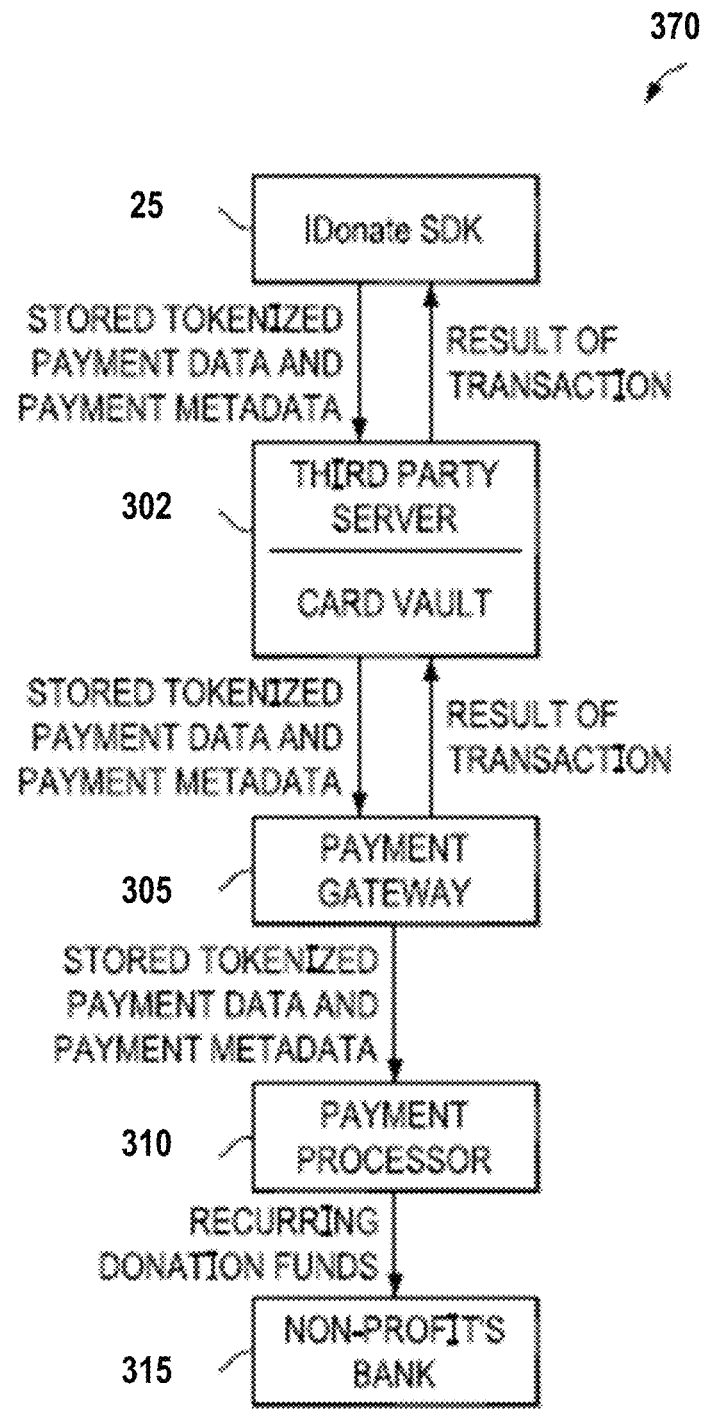
FIG. 8 is a data flow diagram associated with the system of FIG. 1 and the method of FIG. 7, according to an example embodiment.

The method 200 may be altered in a variety of ways. For example, in some embodiments, the payment metadata collected by the embeddable form 50 includes non-profit layer data regarding a recurring donation. That is, the metadata created based on the data received during the step 210 includes a specified time interval between recurring donations. The data regarding a recurring donation, in some embodiments, will include a preference that a donation should be recurring, the amount of the recurring donation, and the frequency of the recurring donation. The frequency of the recurring donation may be defined by providing a period of time between donations or as a number of donations to be distributed over a period of time. In some embodiments, the recurring donations will continue until the donor takes an affirmative step to stop them. In other embodiments, the donor will define a time frame for the recurring donations or a discrete number of donation transactions to be made. In such embodiments, there is no need for any express action from the donor to stop the recurring donations at the end of the defined time frame or when the discrete number of donation transactions are carried out. The method 200 may include steps relating to the execution of recurring donations. FIG. 7 is a flow chart representing additional steps in the method 200 of using the SDK 25 to carry out a recurring online donation transaction, according to an example embodiment. At step 350, the SDK 25 determines that the time interval between specified recurring donations has passed; at the step 355, the SDK 25 retrieves the stored unique token associated with the payment data and the payment metadata; at the step 360, the SDK 25 executes a donation transaction; and then at the step 365, the SDK 25 records the donation transaction on a server associated with the SDK 25. FIG. 8 is data flow 370 associated with the system 10 during the steps 350, 355, 360, and 365.

In some embodiments and at the step 350, the SDK 25 determines if the defined time interval has passed between recurring donations or otherwise determines that it another recurring donation should be executed.

In some embodiments and at the step 355, upon determining that the time interval has passed, the SDK 25 retrieves the stored tokenized payment data and payment metadata.

In some embodiments and at the step 360, after recalling the stored tokenized payment and the payment metadata, the SDK 25 executes a donation transaction. The method of executing a donation transaction is identical or similar to the step 210. Thus, further detail will not be provided here.

In some embodiments and at the step 365, the SDK 25 records the result of the transaction and other related data in a data log on a server associated with the SDK 25.

The system 10 and/or completion of at least a portion of the method 200 overcomes technical problems with the prior art, specifically the problem that a non-profit must host a server to process donation transactions. With the system 10 and/or completion of at least a portion of the method 200, the unique token and payment metadata are transmitted directly from the browser that displays the non-profit webpage 45 to the SDK 25, never being stored or passing through a server associated with the non-profit, such as the non-profit hosted server 35.

In some embodiments, the SDK 25 is a combination of algorithm(s), executable code, and APIs bundled together, with each, all, or a combination thereof, stored, or at least associated with, a server (together the "SDK"). In some embodiments, the SDK 25 includes an HTML file that the web browser uses to display the webpage 45. The SDK 25 is easily configured to receive a variety of combinations of non-profit layer data. The SDK 25 provides a variety of non-profit data modules, with each module associated with a type of non-profit data. FIG. 9 is a diagrammatic illustration of plurality of modules that can be used to receive the payment metadata. As illustrated, the SDK 25 provides the recurring donation module 400 that receives an input regarding a donor's preference on a recurring donation, a campaign identifier module 405 that receives an input regarding a campaign identifier, the tribute gift module 80 that receives an input regarding a donor's preference regarding a tribute gift, an anonymity preference module 410 that receives an input regarding a donor's preference on whether to remain anonymous, a corporate match designation module 415 that receives an input regarding a donor's preference on a corporate match, the amount module 60, the fund designation module 65 that receives an input regarding a donor's preference regarding fund designation, a recurring donation module 420 that receives an input regarding a time interval between recurring donations, and the designated funds module 75. In some embodiments, the non-profit layer data includes data entered via one or more of the modules 60, 65, 70, 75, 80, 400, 405, 410, 415, and 420. However, the non-profit layer data may be entered via other types of modules that collect different non-profit related data. In some embodiments, before or during providing the embeddable form at the step 205, a plurality of modules adapted to receive payment metadata are provided. For example, the plurality of modules may include the modules 60, 65, 70, 75, 80, 400, 405, 410, 415, and 420. In some embodiments, a module is a website module and may include a portion of HTML. The modules 60, 65, 70, 75, 80, 400, 405, 410, 415, and 420 may form a module library from which a subset of modules can be selected to display on a webpage.

The plurality of modules may be provided to the non-profit so that the non-profit can customize the modules displayed in the embeddable form 45. As such, the SDK 25 receives the selection of a subset of modules from the plurality of modules and the embeddable form is configured to include the selected subset of modules from the plurality of modules. In some embodiments, a CRM application is associated with the non-profit. In some embodiments, at least a portion of the plurality of modules is configured to receive data that corresponds with fields in the CRM application. In this instance and in some embodiments, the SDK 25 automatically maps the data that corresponds with the fields in the CRM application to the fields in the CRM application during the method 200. Generally, a module is configured to receive the input from a user via a webpage or other electronic user interface. With the system 10, the inputs are stored as payment information metadata. In some embodiments, the payment information is enriched with the inputs from the modules. Mapping payment metadata to the CRM application improves the technical field of data capture and processing for online donation transactions. Specifically, automatically capturing, storing, and sorting non-profit layer data improves the accuracy of the associations between values and fields.

In some embodiments, a non-profit identifies the desired combination of modules to be displayed on a webpage or other electronic user interface, along with a payment module that is configured to receive the payment information. This combination of modules can be displayed on a webpage associated with the non-profit via, for example, JavaScript such that the SDK for non-profit layer data capture runs in a potential donor's browser. In some embodiments, the server 20 runs the code and processes the data, thereby preventing a server associated with the non-profit entity from storing and executing the code and processing payments.

In some embodiments, the server 20 receives and stores the non-profit layer data, donation transactions, and/or the metadata associated with the non-profit layer data. In some embodiments, the SDK 25 automatically sends the non-profit layer data and/or the metadata associated with the non-profit layer data to a computer associated with the non-profit, such as the non-profit computing system 30. In some embodiments, the non-profit layer data and/or the metadata associated with the non-profit layer data is automatically mapped to a customer relationship management application ("CRM") of the non-profit. In some embodiments, the SDK 25 shares the non-profit layer data and/or the metadata associated with the non-profit layer data with a computer or computer application associated with the non-profit using webhooks. In some embodiments, the modules selected by the non-profit correspond with fields of the CRM such that the metadata is formatted to correspond with the fields on the CRM.

In some embodiments, the server 20 may comprise a computer processor, a memory comprising instructions, and a communication module. These elements may be in direct or indirect communication with each other, for example via one or more buses.

In one or more example embodiments, the SDK 25 or a portion of the SDK 25 is stored as instructions in the memory of the server 20 and/or in a computer readable medium. In some embodiments, the SDK 25 includes and/or executes one or more web-based programs, Intranet-based programs, and/or any combination thereof. In an example embodiment, the SDK 25 includes an application that includes a computer program including a plurality of instructions, data, and/or any combination thereof. In an example embodiment, the application is written in, for example, Hypertext Markup Language (HTML), Cascading Style Sheets (CSS), JavaScript, Extensible Markup Language (XML), asynchronous JavaScript and XML (Ajax), and/or any combination thereof. In an example embodiment, the application is a web-based application written in, for example, Java or Adobe Flex, which pulls real-time information from another computer and/or a plurality of data sources. In an example embodiment, the application pulls real-time information from the plurality of data sources, upon the execution, opening or start-up of the application. In an example embodiment, the application is stored on the computer readable medium and/or in the database.

Figure 10:
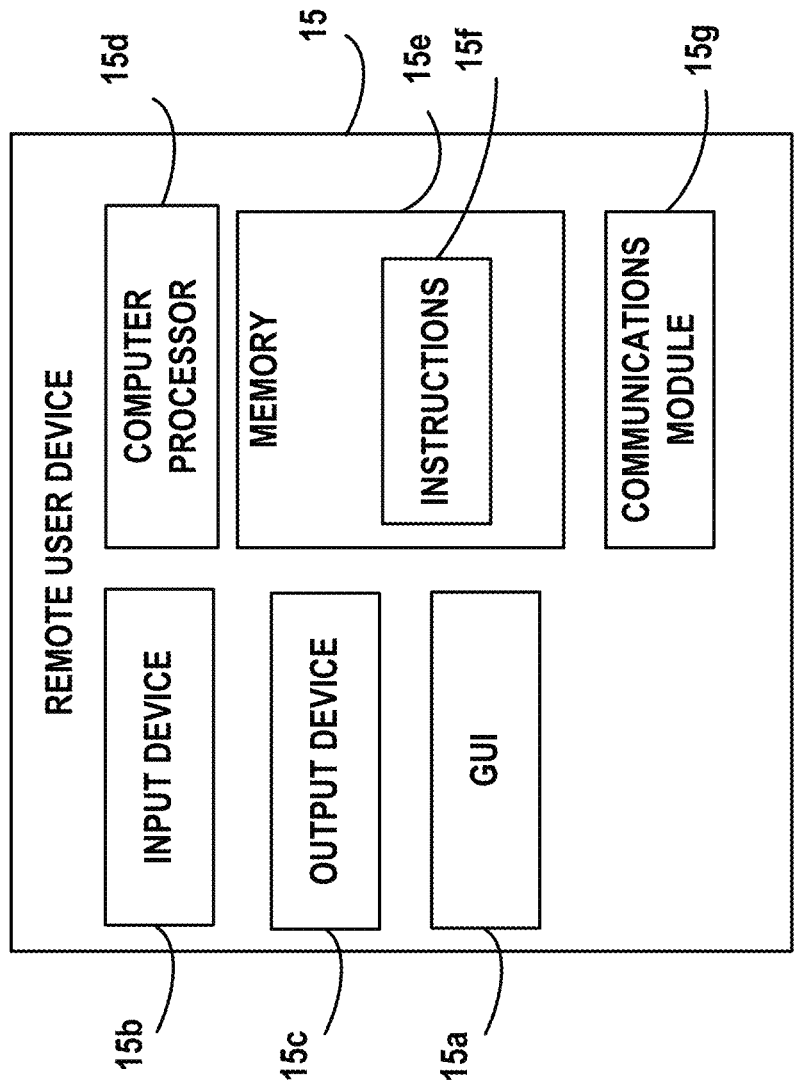
FIG. 10 is a diagrammatic illustration of the remote user device of FIG. 1, according to an example embodiment.

In an example embodiment, as illustrated in FIG. 10 with continuing reference to FIG. 1, the remote user device 15 may comprise the GUI 15a, an input device 15b, an output device 15c, a computer processor 15d, a memory 15e comprising instructions 15f, and a communication module 15g. These elements may be in direct or indirect communication with each other, for example via one or more buses. Generally, the GUI 15a is capable of displaying a plurality of windows or webpages to the user 42. In some embodiments, the input device 15b and the output device 15c are the GUI 15a. In some embodiments, the user 42 provides inputs to the system 10 via the webpage 45 that is displayed on the GUI 15a.

In an example embodiment, the network 40 includes the Internet, one or more local area networks, one or more wide area networks, one or more cellular networks, one or more wireless networks, one or more voice networks, one or more data networks, one or more communication systems, and/or any combination thereof.

Figure 11:
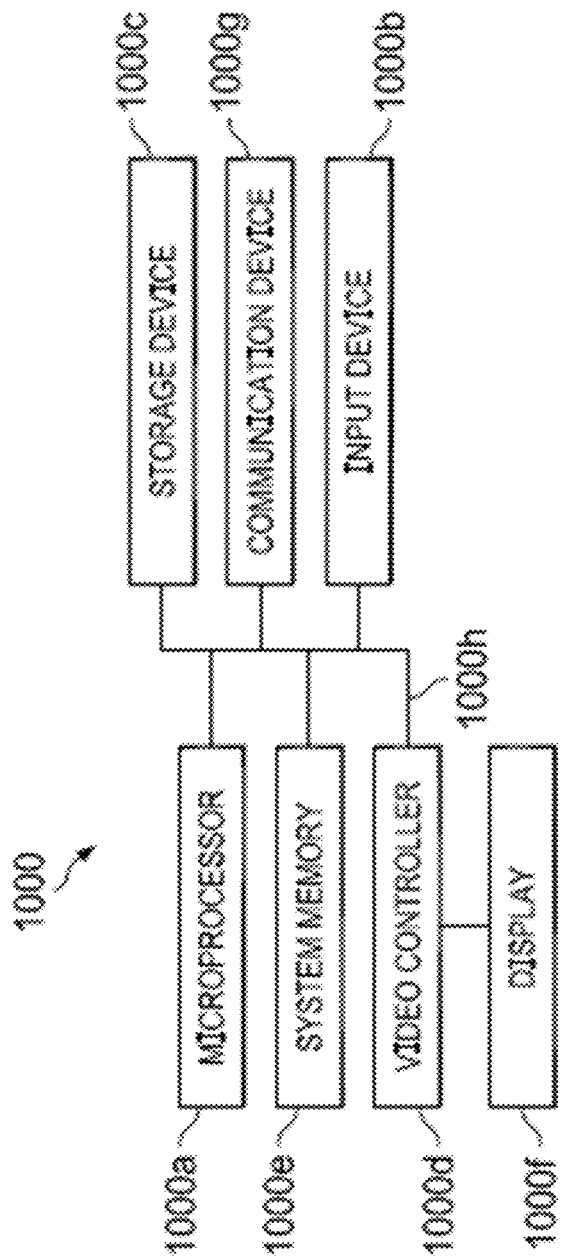
FIG. 11 is a diagrammatic illustration of a node for implementing one or more example embodiments of the present disclosure, according to an example embodiment.

In an example embodiment, as illustrated in FIG. 11 with continuing reference to FIGS. 1 and 3-10, an illustrative node 1000 for implementing one or more of the example embodiments described above and/or illustrated in FIGS. 1 and 3-10 is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of non-transitory computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones, and cell phones.

In several example embodiments, one or more of the components of the systems described above and/or illustrated in FIGS. 1 and 3-10 include at least the node 1000 and/or components thereof, and/or one or more nodes that are substantially similar to the node 1000 and/or components thereof. In several example embodiments, one or more of the above-described components of the node 1000, the system, and/or the example embodiments described above and/or illustrated in FIGS. 1 and 3-10 include respective pluralities of same components.

In several example embodiments, one or more of the applications, systems, and application programs described above and/or illustrated in FIGS. 1 and 3-10 include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessors 1000*a*, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

The present disclosure introduces a method of conducting a donation transaction, the method including: (a) providing, via a network, an embeddable form, wherein the embeddable form is associated with a non-profit, and wherein the embeddable form is adapted to be displayed on a graphical user interface to receive: payment data, and payment metadata associated with the payment data; (b) transmitting, via the embeddable form and the network, the payment data to a third-party server for tokenization of the payment data; (c) receiving, by a software development kit ("SDK") and via the network: a unique token associated with the payment data; and the payment metadata associated with the payment data; (d) executing, by the SDK, the donation transaction in accordance with: the unique token associated with the payment data, and the payment metadata associated with the payment data; and (e) during and/or after the step (d), storing, by the SDK, the unique token associated with the payment data and the payment metadata associated with the payment data. In one embodiment, the method further includes: (f) before the step (a), receiving, via the network, selection(s) of module(s) from a plurality of modules; wherein the embeddable form provided at the step (a) includes the module(s) selected at the step (f); and wherein the module(s) of the embeddable form are adapted to receive the payment metadata associated with the payment data. In one embodiment, the payment metadata received by the module(s) of the embeddable form correspond to fields in a customer relationship management ("CRM") application associated with the non-profit; and wherein the method further includes: (g) automatically mapping, by the SDK, the payment metadata to the fields in the CRM application associated with the non-profit. In one embodiment, at the step (g), the SDK uses webhooks to automatically map the payment metadata to the fields in the CRM application associated with the non-profit. In one embodiment, the method also includes (h) recording, by the SDK, the donation transaction on a server associated with the SDK. In one embodiment, the payment metadata includes data related to: a recurring donation; a campaign identifier; a tribute gift; an anonymity preference; a fund designation; or any combination thereof. In one embodiment, the payment metadata includes data relating to the recurring donation; wherein the data relating to the recurring donation includes a time interval; and wherein the method further includes: (i) determining, by the SDK, that the time interval has passed; (j) after the step (i), accessing, by the SDK: the stored unique token associated with the payment data, and the stored payment metadata associated with the payment data; (k) executing, by the SDK, another donation transaction, wherein the another donation transaction is made in accordance with: the unique token associated with the payment data, and the payment metadata associated with the payment data; (l) recording, by the SDK, the another donation transaction on a server associated with the SDK. In one embodiment, the method also includes: (m) storing, by the SDK and on a server associated with the SDK: the unique token associated with the payment data, and the payment metadata associated with the payment data. In one embodiment, the method also includes (n) displaying the embeddable form on the graphical user interface using a web browser and an HTML file; (o) tokenizing, by the third-party server, the payment data to create the unique token associated with the payment data; and (p) receiving, by the web browser and before the step (c), the unique token associated with the payment data; wherein receiving, by the web browser, the unique token associated with the payment data is in response to a callback function in the HTML file. In one embodiment, the method also includes (q) receiving, via the embeddable form and using the web browser, the payment data and the payment metadata, wherein, at the step (b), the payment data is transmitted to the third-party server via the network and from the web browser; and wherein, at the step (c), the unique token and the payment metadata are received by the SDK and from the web browser.

The present disclosure also introduces a system configured to conduct a donation transaction, the system including a non-transitory computer readable medium having stored thereon a plurality of instructions, wherein the instructions are executed with one or more processors so that the following steps are executed: (a) providing, via a network, an embeddable form, wherein the embeddable form is associated with a non-profit, and wherein the embeddable form is adapted to be displayed on a graphical user interface to receive: payment data, and payment metadata associated with the payment data; (b) transmitting, via the embeddable form and the network, the payment data to a third-party server for tokenization of the payment data; (c) receiving, by a software development kit ("SDK") and via the network: a unique token associated with the payment data; and the payment metadata associated with the payment data; (d)

executing, by the SDK, the donation transaction in accordance with: the unique token associated with the payment data, and the payment metadata associated with the payment data; and (e) during and/or after the step (d), storing, by the SDK, the unique token associated with the payment data and the payment metadata associated with the payment data. In one embodiment, the instructions are executed with the one or more processors so that the following step is also executed: (f) before the step (a), receiving, via the network, selection(s) of module(s) from a plurality of modules; wherein the embeddable form provided at the step (a) includes the module(s) selected at the step (f); and wherein the module(s) of the embeddable form are adapted to receive the payment metadata associated with the payment data. In one embodiment, the payment metadata received by the module(s) of the embeddable form correspond to fields in a customer relationship management ("CRM") application associated with the non-profit; and wherein the instructions are executed with the one or more processors so that the following step is also executed: (g) automatically mapping, by the SDK, the payment metadata to the fields in the CRM application associated with the non-profit. In one embodiment, at the step (g), the SDK uses webhooks to automatically map the payment metadata to the fields in the CRM application associated with the non-profit. In one embodiment, the instructions are executed with the one or more processors so that the following step is also executed: (h) recording, by the SDK, the donation transaction on a server associated with the SDK. In one embodiment, the payment metadata includes data related to: a recurring donation; a campaign identifier; a tribute gift; an anonymity preference; a fund designation; or any combination thereof. In one embodiment, the payment metadata includes data relating to the recurring donation; wherein the data relating to the recurring donation includes a time interval; and wherein the instructions are executed with the one or more processors so that the following steps are also executed: (i) determining, by the SDK, that the time interval has passed; (j) after the step (i), accessing, by the SDK: the stored unique token associated with the payment data, and the stored payment metadata associated with the payment data; (k) executing, by the SDK, another donation transaction, wherein the another donation transaction is made in accordance with: the unique token associated with the payment data, and the payment metadata associated with the payment data; (l) recording, by the SDK, the another donation transaction on a server associated with the SDK. In one embodiment, the instructions are executed with the one or more processors so that the following step is also executed: (m) storing, by the SDK and on a server associated with the SDK: the unique token associated with the payment data, and the payment metadata associated with the payment data. In one embodiment, the instructions are executed with the one or more processors so that the following steps are also executed: (n) displaying the embeddable form on the graphical user interface using a web browser and an HTML file; (o) tokenizing, by the third-party server, the payment data to create the unique token associated with the payment data; and (p) receiving, by the web browser and before the step (c), the unique token associated with the payment data; wherein receiving, by the web browser, the unique token associated with the payment data is in response to a callback function in the HTML file. In one embodiment, the instructions are executed with the one or more processors so that the following step is also executed: (q) receiving, via the embeddable form and using the web browser, the payment data and the payment metadata, wherein, at the step (b), the payment data is transmitted to the third-party server via the network and from the web browser; and wherein, at the step (c), the unique token and the payment metadata are received by the SDK and from the web browser.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations. Moreover, one or more of the example embodiments disclosed above and in one or more of FIGS. 1 and 3-10 may be combined in whole or in part with any one or more of the other example embodiments disclosed above and in one or more of FIGS. 1 and 3-10.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method of conducting a donation transaction, the method comprising:
(a) providing, via a network, an embeddable form, wherein the embeddable form is associated with a non-profit, and wherein the embeddable form is adapted to be displayed on a graphical user interface of a web browser of a donor to receive:

payment data, and
payment metadata associated with the payment data;
(b) transmitting, via the embeddable form and the network, the payment data to a third-party server for tokenization of the payment data;
(c) receiving, by the web browser:
a unique token associated with the payment data;
(d) transmitting, from the web browser and via the network, the unique token associated with the payment data and the payment metadata associated with the payment data to a software development kit (SDK),
(e) receiving, at the SDK:
the unique token associated with the payment data; and
the payment metadata associated with the payment data;
(f) executing, by the SDK, the donation transaction in accordance with: the unique token associated with the payment data, and the payment metadata associated with the payment data; and
(g) during and/or after the step (f), storing, by the SDK, the unique token associated with the payment data and the payment metadata associated with the payment data.

2. The method of claim 1, wherein the method further comprises:
(h) before the step (a), receiving, via the network, selection(s) of module(s) from a plurality of modules;
wherein the embeddable form provided at the step (a) comprises the module(s) selected at the step (h); and
wherein the module(s) of the embeddable form are adapted to receive the payment metadata associated with the payment data.

3. The method of claim 2,
wherein the payment metadata received by the module(s) of the embeddable form correspond to fields in a customer relationship management ("CRM") application associated with the non-profit; and
wherein the method further comprises:
(i) automatically mapping, by the SDK, the payment metadata to the fields in the CRM application associated with the non-profit.

4. The method of claim 3, wherein, at the step (i), the SDK uses webhooks to automatically map the payment metadata to the fields in the CRM application associated with the non-profit.

5. The method of claim 1, further comprising:
(j) recording, by the SDK, the donation transaction on a server associated with the SDK.

6. The method of claim 1, wherein the payment metadata comprises data related to:
a recurring donation;
a campaign identifier;
a tribute gift;
an anonymity preference;
a fund designation; or
any combination thereof.

7. The method of claim 6,
wherein the payment metadata comprises data relating to the recurring donation;
wherein the data relating to the recurring donation comprises a time interval; and
wherein the method further comprises:
(k) determining, by the SDK, that the time interval has passed;
(l) after the step (k), accessing, by the SDK:
the stored unique token associated with the payment data, and
the stored payment metadata associated with the payment data;
(m) executing, by the SDK, another donation transaction, wherein the another donation transaction is made in accordance with:
the unique token associated with the payment data, and
the payment metadata associated with the payment data; and
(n) recording, by the SDK, another donation transaction on a server associated with the SDK.

8. The method of claim 1, further comprising:
(o) storing, by the SDK and on a server associated with the SDK:
the unique token associated with the payment data, and
the payment metadata associated with the payment data.

9. The method of claim 1, further comprising:
(p) displaying the embeddable form on the graphical user interface using a web browser and an HTML file;
(q) tokenizing, by the third-party server, the payment data to create the unique token associated with the payment data; and
wherein the unique token associated with the payment data at step (c) is in response to a callback function in the HTML file.

10. The method of claim 9, further comprising:
(r) receiving, via the embeddable form and using the web browser, the payment data and the payment metadata,
wherein, at the step (b), the payment data is transmitted to the third-party server via the network and from the web browser.

11. A system configured to conduct a donation transaction, the system comprising a non-transitory computer readable medium having stored thereon a plurality of instructions, wherein the instructions are executed with one or more processors so that the following steps are executed:
(a) providing, via a network, an embeddable form,
wherein the embeddable form is associated with a non-profit, and
wherein the embeddable form is adapted to be displayed on a graphical user interface of a web browser of a donor to receive:
payment data, and
payment metadata associated with the payment data;
(b) transmitting, via the embeddable form and the network, the payment data to a third-party server for tokenization of the payment data;
(c) receiving, by the web browser:
a unique token associated with the payment data;
(d) transmitting, from the web browser and via the network, the unique token associated with the payment data and the payment metadata associated with the payment data to an SDK;
(e) receiving, at the SDK:
the unique token associated with the payment data; and
the payment metadata associated with the payment data;
(f) executing, by the SDK, the donation transaction in accordance with:
the unique token associated with the payment data; and
the payment metadata associated with the payment data; and
(g) during and/or after the step (f), storing, by the SDK, the unique token associated with the payment data and the payment metadata associated with the payment data.

12. The system of claim 11, wherein the instructions are executed with the one or more processors so that the following step is also executed:
 (h) before the step (a), receiving, via the network, selection(s) of module(s) from a plurality of modules;
 wherein the embeddable form provided at the step (a) comprises the module(s) selected at the step (h); and
 wherein the module(s) of the embeddable form are adapted to receive the payment metadata associated with the payment data.

13. The system of claim 12,
 wherein the payment metadata received by the module(s) of the embeddable form correspond to fields in a customer relationship management ("CRM") application associated with the non-profit; and
 wherein the instructions are executed with the one or more processors so that the following step is also executed:
 (i) automatically mapping, by the SDK, the payment metadata to the fields in the CRM application associated with the non-profit.

14. The system of claim 13, wherein, at the step (i), the SDK uses webhooks to automatically map the payment metadata to the fields in the CRM application associated with the non-profit.

15. The system of claim 11, wherein the instructions are executed with the one or more processors so that the following step is also executed:
 (j) recording, by the SDK, the donation transaction on a server associated with the SDK.

16. The system of claim 11, wherein the payment metadata comprises data related to:
 a recurring donation;
 a campaign identifier;
 a tribute gift;
 an anonymity preference;
 a fund designation; or
 any combination thereof.

17. The system of claim 16,
 wherein the payment metadata comprises data relating to the recurring donation;
 wherein the data relating to the recurring donation comprises a time interval; and
 wherein the instructions are executed with the one or more processors so that the following steps are also executed:
  (k) determining, by the SDK, that the time interval has passed;
  (l) after the step (k), accessing, by the SDK:
   the stored unique token associated with the payment data, and
   the stored payment metadata associated with the payment data;
  (m) executing, by the SDK, another donation transaction, wherein the another donation transaction is made in accordance with:
   the unique token associated with the payment data, and
   the payment metadata associated with the payment data;
  (n) recording, by the SDK, the another donation transaction on a server associated with the SDK.

18. The system of claim 11, wherein the instructions are executed with the one or more processors so that the following step is also executed:
 (o) storing, by the SDK and on a server associated with the SDK:
  the unique token associated with the payment data, and
  the payment metadata associated with the payment data.

19. The system of claim 11, wherein the instructions are executed with the one or more processors so that the following steps are also executed:
 (p) displaying the embeddable form on the graphical user interface using a web browser and an HTML file;
 (q) tokenizing, by the third-party server, the payment data to create the unique token associated with the payment data; and
 wherein the unique token associated with the payment data at step (c) is in response to a callback function in the HTML file.

20. The system of claim 19, wherein the instructions are executed with the one or more processors so that the following step is also executed:
 (r) receiving, via the embeddable form and using the web browser, the payment data and the payment metadata,
 wherein, at the step (b), the payment data is transmitted to the third-party server via the network and from the web browser.

* * * * *